United States Patent Office 3,325,093
Patented June 13, 1967

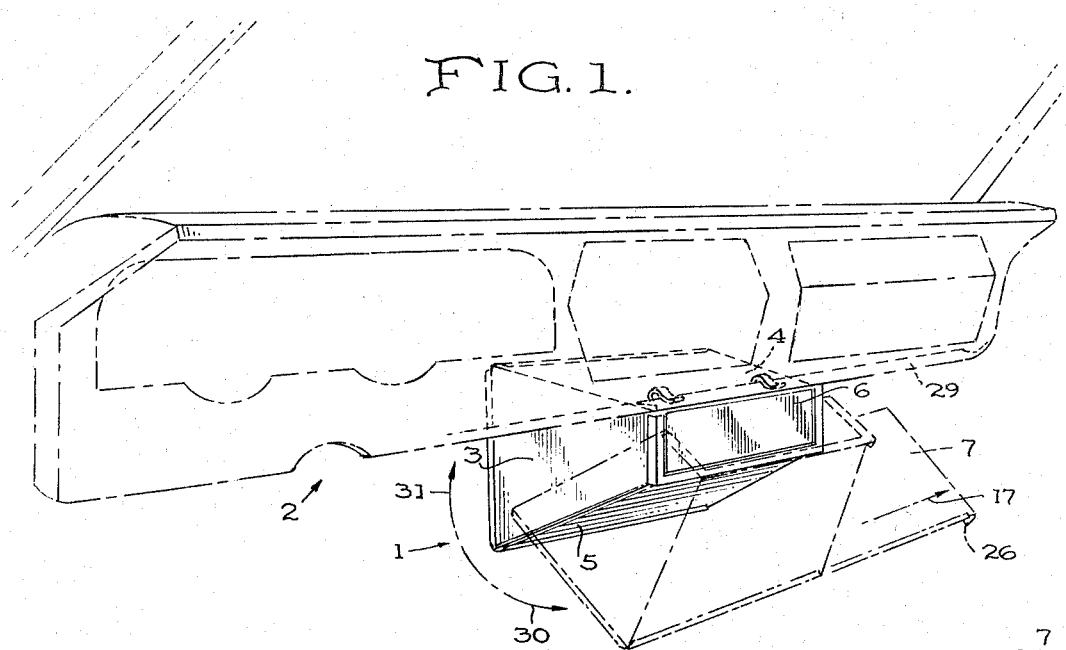
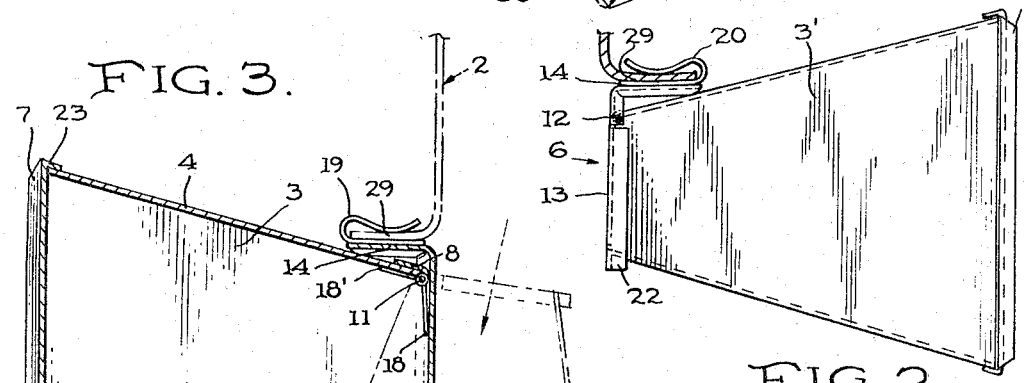
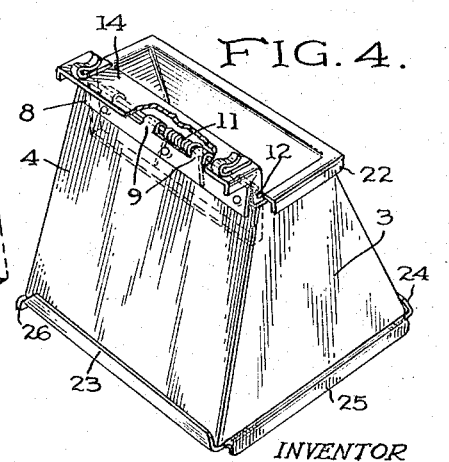
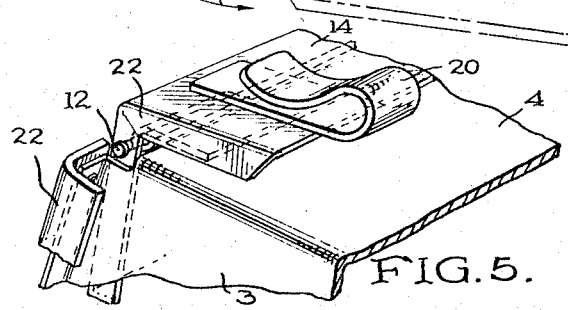

3,325,093
WASTE RECEPTACLE
Luis A. Echavarren, Bethesda, Md., assignor of fifteen percent to Robert L. Price, Springfield, Va.
Filed June 9, 1966, Ser. No. 556,412
8 Claims. (Cl. 232—43.1)

This invention relates, in general, to a waste receptacle and, more particularly, to a waste receptacle for use in automobiles.

The disposal of trash and litter from motor vehicles is a serious and growing problem as increased travel has encouraged the carrying of materials such as tissues, wrapped food, and the like in automobiles which necessarily generates a large amount of refuse. An examination of the roadsides of the Nation's highways furnishes ample evidence that much of this refuse has been discharged from the vehicles during travel. A primary cause of this highway littering resides in the fact that the interior of the conventional automobile is normally unequipped with a suitable depository for receiving discarded materials.

Various types of portable waste disposals for automobiles have been proposed heretofore, including those comprising an open container disposed on the underside of the automobile dashboard. However, none of these prior disposals have proven entirely satisfactory by reason of their unsightly appearance, space problems and difficulties in removing the deposited refuse.

It is accordingly one object of the present invention to provide a portable waste receptacle adapted to be removably attached to the underside of the instrument panel of an automobile in a convenient accessible position which obviates the several objections to prior waste disposals.

Another object of the invention is to provide a simple and inexpensively manufactured waste disposal which is enclosed on all sides to prevent spillage of the contents and which is adapted to closely engage the underside of an automobile dashboard and remain substantially out of view when not in use.

Other objects and advantages of the invention will become apparent as the description thereof proceeds.

Reference is now made to the drawings accompanying the application wherein:

FIGURE 1 represents a front perspective view of the dashboard of an automobile with the receptacle mounted thereon, the open position of the receptacle being shown in phantom position;

FIGURE 2 is a side elevational view of the receptacle in closed position;

FIGURE 3 represents a cross-sectional side view of the receptacle in mounted position showing the open position of the receptacle in phantom;

FIGURE 4 illustrates a top perspective view of the receptacle with the cover in open position, particularly showing the hinge mechanism; and FIGURE 5 represents an enlarged sectional view of the receptacle showing one embodiment of attachment means in detail.

Briefly stated, the present invention relates to a waste receptacle adapted to be mounted on an automobile dashboard, comprising in combination, a container having a pair of side walls, top and bottom walls, a removable rear wall, and a front wall forming a walled enclosure, said front wall forming a cover portion which is axially hinged to said top wall; and mounting means for securing said receptacle to an automobile dashboard; said axially hinged front wall being adapted to permit the receptacle to swing forward manually to provide access thereto and said rear wall providing means for removal of accumulated contents.

Referring now more particularly to the drawings accompanying the application wherein like reference characters designate like parts, the receptacle, generally indicated by reference numeral 1, is shown in FIGURE 1 secured to a conventional automobile instrument panel or dashboard 2 as shown in broken lines.

The receptacle 1, in the embodiment illustrated in the drawings, comprises generally side walls 3 and 3', top wall 4, bottom wall 5, front wall 6 and slidable rear wall 7. As shown in the drawings, the side walls 3 and 3', top wall 4 and bottom wall 5 are wider at the back than at the front, thus providing greater space in the container to receive a large amount of refuse. Additionally, this construction provides the further advantage that the large receiving area of the receptacle can be positioned substantially within the space formed by projection of the dashboard into the forward compartment of the automobile leaving only the front wall 6 exposed to view, thus presenting an overall attractive appearance.

This is an especially important feature of the invention in view of the increasing emphasis placed on the appearance of today's automobiles. However, it is to be understood that other shapes of the receptacle such as squares, rectangles, etc. may be employed as desired.

One of the most important features of the receptacle of this invention and one on which novelty is predicated, resides in the means whereby the receptacle is adapted to swing out to assume a vertical position when desiring to place refuse in the receptacle and automatically returning to its normal or horizontal position after the refuse is deposited. As the receptacle is pulled forward manually in the direction of the arrow (FIGURE 1), means are provided to provide access to the interior of the receptacle through top portion 6. These advantages will become apparent from the following description of the specific parts and operation of the receptacle.

As seen particularly in FIGURES 2, 3 and 4, the top wall 4 of the receptacle is provided with a laterally secured transverse strip 8 positioned along the periphery of its forward edge. Strip 8 may be secured to top 4 by rivets, bolts, adhesives or similar means as desired. In a preferred embodiment, the forward or leading edge of transverse strip 8 extends slightly beyond the forward edge of top 4 to form a lip portion which has the projecting portions thereof folded as at 9 to provide a receptacle of bearing for insertion of a spring hinge 10 (see FIGURE 4). Spring hinge 10 is of the conventional type and comprises generally a biased spring 11 disposed on a spindle 12 which is rotatable against the biased spring within holder or bearing 9. It is to be noted in the drawing (FIGURE 4) that parts of the lip portion of transverse strip 8 have been cut away prior to folding to form the bearing 9, a technique which provides space for insertion of spring 11. It should be understood however that other types of spindle bearing means may be employed if desired.

Also disposed on spindle 9 in a pivotable manner is front wall 6 as illustrated in FIGURES 2, 4, and 5. Front wall 6 is generally in the shape of a right angle with the larger portion 13 serving as the cover portion and smaller side 14 thereof serving as the support for the attaching means for securing the receptacle to the automobile dashboard and also as the fulcrum means for the movable cover. At each side of front wall portion 13, small apertures are provided for passage therethrough of the outermost portions of spindle 12. Therefore, as is clear from FIGURES 4 and 5, angled front cover 6 is disposed in a hinged position about spindle 12 and is movable thereon against the action of spring 11.

As pointed out hereinabove, hinge spring 11 is also positioned on spindle 12, and serves as the means whereby front wall 6 is opened and closed. As seen particularly in FIGURES 3 and 4, hinge spring 11 is biased against the interior side of front wall 6 at points 18 and 18', respectively, of the spring. Thus, the biased position of the spring serves to compel receptacle to return to its closed position after the user deposits material in the receptacle.

As seen most clearly in FIGURES 2 and 4, a flange portion 22 is provided adjacent to three sides of front wall 6. This flange while serving in a decorative capacity, also functions in protecting the user against possible sharp portions of the leading edges of the side and bottom walls. Additionally, the flange serves an important function in providing a means to grip the receptacle when pulling forward to deposit refuse as described hereinafter.

Rear wall 7 of the receptacle also constitutes a novel feature of the present invention. Rear wall 7, as seen in FIGURES 1, 2 and 4, comprises a flat portion of a size adapted to cover the complete rear opening of the receptacle. Flat portion 7 is provided on its sides with a pair of up-turned dove-tail shaped flanges 23 and 24 which are adapted to slidably engage top wall 4 and bottom wall 5, respectively. The ends of the wall 7 are provided with a pair of down-turned flanges 25 and 26 which are adapted to be grasped by the user's fingers when emptying the receptacle.

When desiring to empty the receptacle, one of the down-turned flanges 25 or 26 is merely grasped by the user and slid in the direction of arrow 17 in FIGURE 1 or in the opposite direction as desired. The upturned flanges 23 and 24 grasp the top and bottom walls, respectively, and serve to guide the slidable wall. After emptying, the receptacle is closed by sliding rear wall 7 back to its original position. The flanges on rear wall 7 fit adjacent the side, top, and bottom walls as seen in FIGURE 4. It should be understood however, that the flange positions on the rear wall may be reversed if desired. It should also be understood that other means for removing the rear wall may be employed, such as hinges or the like.

Disposed on the rearward side of the smaller portion of front wall 6 are a pair of conventional spring clips 19 and 20 which serve as the means for attachment of the receptacle to the automobile dashboard. As clearly illustrated in FIGURE 5, each clip comprises a single strip of material bonded at one end thereof to the small portion of front wall 6. The strip is then folded at about its mid point and bent back to form the clip as illustrated clearly in FIGURE 5. In instances where the spring clip and receptacle are constructed of metal, bonding of the clip to the receptacle may be carried out by welding or the like. Where the materials are composed of plastic, the bonding may be conducted by a heated molding operation. It is to be understood however that the attachment may be by bolts, rivets, permanent magnets or the like, as desired depending on the dashboard construction.

The receptacle may be constructed of sheet metal, high impact plastic or the like as desired. However, the receptacle constructed of tin or sheet metal is preferred as such materials afford higher quality products for today's automobiles.

The receptacle of this invention as illustrated in FIGURE 1, is positioned on the underside of the automobile dash by insertion of the spring clips over the protruding flange on the underside of the conventional automobile dashboard. When the receptacle is in place, it assumes the position shown in FIGURES 1 and 3. It is to be noted that the receptacle fits within the well formed by the dashboard overhang and therefore remains substantially hidden from view of the automobile's occupants. It is further to be noted in this respect that only the relatively narrow front wall 6 of the recepatcle is in view of the occupants.

When it is desired to deposit refuse or other material in the receptacle, the user merely grasps the bottom portion of flange 22 and pulls it forward in the direction of downward arrows 30 shown in FIGURES 1 and 3. As the receptacle is pulled forward against the action of spring hinge 11, front wall 6 remains stationary thereby providing an opening for access to the interior of the receptacle, the opening or access portion being indicated by vertical arrow in FIGURE 3. Thus, it may be seen that access to the receptacle is gained, not by movement of the cover, but by movement of the entire receptacle while the top or cover portion remains stationary.

After the refuse or other material has been deposited in the receptacle, the user merely eases the pressure or releases the receptacle and it returns automatically to its original position by action of the biased spring hinge. The movement to the original position is in the direction of upward arrow 31 shown in FIGURES 1 and 3.

A further embodiment of the present invention resides in the means for removal of the accumulated trash from the receptacle without removing the receptacle from the automobile if desired. According to this embodiment, the receptacle is merely pulled forward until it is in the vertical or upright position and slidable rear wall or bottom 7 is moved outwardly in the direction of arrow 17 shown in FIGURE 1. As the bottom is removed, the trash is merely allowed to fall into a container for removal from the automobile. It is thus apparent that the receptacle may be considered as a permanent fixture in the automobile. Obviously, however, the receptacle may be removed from the automobile for discharging the contents if desired.

Obviously, many modifications and variations of the invention as hereinabove set forth, may be made without departing from the spirit and scope thereof, and therefore only such limitations should be imposed as indicated in the appended claims.

I claim:

1. A receptacle adapted for mounting on an automobile dashboard comprising in combination a container having a pair of side walls, top and bottom walls, a slidably removable rear wall and a front wall thereby forming a walled enclosure; said front wall forming a cover portion which is axially hinged to said top wall; mounting means on said front wall for securing said receptacle to an automobile dashboard, said axially hinged front wall being adapted to permit the receptacle to swing forward about said cover portion to provide access thereto and said slidable rear wall providing means for removal of accumulated contents.

2. A receptacle according to claim 1 wherein said front wall is pivotally secured to a spindle mounted on said top wall.

3. A receptacle according to claim 2 wherein said front wall extends beyond said spindle at substantially a right angle to said cover portion to provide support means for said mounting means.

4. A receptacle according to claim 1 wherein said receptacle is deeper at the rear than at the front portion thereof.

5. A receptacle according to claim 3 wherein said cover portion and said top wall are biased against a spring-hinge means.

6. A receptacle according to claim 3 wherein said attachment means are spring clips.

7. A receptacle according to claim 5 wherein said spring-hinge means is mounted on said spindle means.

8. A receptacle according to claim 2 wherein said spindle is pivotally secured to a transverse strip mounted on the leading edge of said top wall.

References Cited

UNITED STATES PATENTS

| | | | |
|---|---|---|---|
| 1,879,858 | 9/1932 | Schroedter | 232—43.1 |
| 2,445,914 | 7/1948 | Hendricks | 220—18 |
| 2,687,847 | 8/1954 | Lippmann | 232—43.3 |
| 2,937,843 | 5/1960 | Goldberg | 206—19.5 |
| 2,965,344 | 12/1960 | Baker | 248—101 |
| 3,004,655 | 10/1961 | Whitnack | 206—19.5 |
| 3,176,950 | 4/1965 | Hittesdorf | 206—19.5 |
| 3,214,228 | 10/1965 | Lewis | 232—43.1 |

DAVID J. WILLIAMOWSKY, *Primary Examiner.*

FRANCIS K. ZUGEL, *Examiner.*